(12) United States Patent
Wertz et al.

(10) Patent No.: US 7,213,367 B2
(45) Date of Patent: *May 8, 2007

(54) SLOW RELEASE NITROGEN SEED COAT

(75) Inventors: Stacy L. Wertz, Conyers, GA (US); Kurt Gabrielson, Lilburn, GA (US); James Knight, Conyers, GA (US); Paul Baxter, Conyers, GA (US); Charles R. Davis, Crossett, AR (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 309 days.

This patent is subject to a terminal disclaimer.

(21) Appl. No.: 10/396,700

(22) Filed: Mar. 26, 2003

(65) Prior Publication Data

US 2003/0228981 A1    Dec. 11, 2003

Related U.S. Application Data

(60) Provisional application No. 60/367,278, filed on Mar. 26, 2002, provisional application No. 60/379,402, filed on May 13, 2002.

(51) Int. Cl.
*A01C 1/06* (2006.01)

(52) U.S. Cl. ............... 47/57.6; 47/58.1 SE; 47/DIG. 9; 402/100

(58) Field of Classification Search ............... 47/57.6, 47/58.1 SE, DIG. 9; 504/100; 402/100
See application file for complete search history.

(56) References Cited

U.S. PATENT DOCUMENTS

| | | | |
|---|---|---|---|
| 2,648,609 A | 8/1953 | Wurster | |
| 2,923,095 A * | 2/1960 | Etcheverry et al. | 504/174 |
| 2,986,840 A * | 6/1961 | Rogers | 71/28 |
| 2,999,336 A | 9/1961 | Cescas | |
| 3,316,676 A | 5/1967 | Legal, Jr. et al. | |
| 3,438,764 A | 4/1969 | Church | |
| 3,598,565 A | 8/1971 | Graves | |
| 3,621,612 A | 11/1971 | Porter | |
| 3,677,736 A | 7/1972 | Formaini | |
| 3,705,794 A * | 12/1972 | Czurak | 71/29 |
| 3,707,807 A | 1/1973 | Graves | |
| 3,713,800 A | 1/1973 | Karnemaat | |
| 3,808,740 A | 5/1974 | Porter et al. | |
| 3,905,152 A | 9/1975 | Loperfido | |
| 3,911,183 A | 10/1975 | Hinkes | |

(Continued)

FOREIGN PATENT DOCUMENTS

| | | |
|---|---|---|
| DE | 43 08 505 A1 | 9/1994 |
| EP | 1 288 179 A1 | 5/2003 |
| GB | 2229350 A * | 9/1990 |
| JP | 50 40321 | 4/1975 |
| JP | 3-22905 | 1/1991 |
| WO | WO 00/46169 * | 8/2000 |

OTHER PUBLICATIONS

Porter, F.E., Chemtech, May 1978, pp. 284-287.

(Continued)

*Primary Examiner*—Andrea M. Valenti
(74) *Attorney, Agent, or Firm*—Banner & Witcoff, Ltd.

(57) ABSTRACT

A seed for enhancing the extended delivery of nitrogen needed for plant development and growth, the seed having a slow release nitrogen coating of a particulate UF polymer adhered to the seed with an adhesive binder.

46 Claims, 2 Drawing Sheets
(1 of 2 Drawing Sheet(s) Filed in Color)

U.S. PATENT DOCUMENTS

| | | |
|---|---|---|
| 3,981,845 A | 9/1976 | Renner |
| 4,025,329 A | 5/1977 | Goertz |
| 4,058,067 A | 11/1977 | Wright et al. |
| 4,066,490 A | 1/1978 | Yoshimi |
| 4,089,899 A | 5/1978 | Greidinger et al. |
| 4,120,685 A | 10/1978 | Varglu et al. |
| 4,174,957 A | 11/1979 | Webb et al. |
| 4,190,981 A | 3/1980 | Muldner |
| 4,192,095 A | 3/1980 | Haslam et al. |
| 4,219,966 A | 9/1980 | McCalister |
| 4,245,432 A | 1/1981 | Dannelly |
| 4,249,343 A | 2/1981 | Dannelly |
| 4,251,952 A | 2/1981 | Porter et al. |
| 4,280,830 A | 7/1981 | Ferguson et al. |
| 4,298,512 A | 11/1981 | Sartoretto et al. |
| 4,333,265 A | 6/1982 | Arnold |
| 4,357,780 A | 11/1982 | Ball |
| 4,378,238 A | 3/1983 | Goertz |
| 4,409,015 A | 10/1983 | Grace, Jr. |
| 4,410,685 A | 10/1983 | Williams |
| 4,411,683 A | 10/1983 | Goertz |
| 4,429,075 A | 1/1984 | Carlson |
| 4,474,925 A | 10/1984 | Sartoretto et al. |
| 4,493,725 A | 1/1985 | Moon et al. |
| 4,501,851 A | 2/1985 | Williams |
| 4,526,606 A | 7/1985 | Formaini |
| 4,530,713 A | 7/1985 | Williams |
| 4,575,391 A | 3/1986 | DeBoodt et al. |
| 4,578,105 A | 3/1986 | Moore |
| 4,596,593 A | 6/1986 | Tazawa et al. |
| 4,735,015 A | 4/1988 | Schmolka |
| 4,735,017 A | 4/1988 | Gago et al. |
| 4,753,035 A | 6/1988 | Ryan et al. |
| 4,780,988 A | 11/1988 | Mielke et al. |
| 4,832,728 A | 5/1989 | Allan et al. |
| 4,960,856 A | 10/1990 | Formaini |
| 4,997,469 A | 3/1991 | Moore |
| 5,022,182 A | 6/1991 | Anderson |
| 5,039,328 A | 8/1991 | Saitoh et al. |
| 5,043,007 A | 8/1991 | Davis |
| 5,044,116 A | 9/1991 | Gago et al. |
| 5,106,648 A | 4/1992 | Williams |
| 5,110,898 A | 5/1992 | Formaini |
| 5,262,381 A | 11/1993 | Tusé et al. |
| 5,266,097 A | 11/1993 | Moore |
| 5,300,127 A | 4/1994 | Williams |
| 5,317,834 A | 6/1994 | Anderson |
| 5,344,471 A | 9/1994 | Tusé et al. |
| 5,443,637 A | 8/1995 | Long, Jr. et al. |
| 5,494,709 A | 2/1996 | Long, Jr. et al. |
| 5,501,720 A * | 3/1996 | Buchholz .................. 71/28 |
| 5,618,330 A | 4/1997 | Sylvester |
| 5,640,803 A | 6/1997 | Kloepper et al. |
| 5,674,971 A | 10/1997 | Graves |
| 5,725,630 A * | 3/1998 | Roberts et al. ............ 71/11 |
| 5,797,976 A | 8/1998 | Yamashita |
| 5,849,320 A | 12/1998 | Turnblad et al. |
| 5,860,245 A | 1/1999 | Welch |
| 5,935,839 A | 8/1999 | Kloepper et al. |
| 5,935,909 A | 8/1999 | Sanders |
| 6,009,663 A | 1/2000 | Kazemzadeh |
| 6,022,827 A | 2/2000 | Kumar et al. |
| 6,048,378 A | 4/2000 | Moore |
| 6,058,649 A | 5/2000 | Bittman et al. |
| 6,088,957 A | 7/2000 | Kazemzadeh |
| 6,202,346 B1 | 3/2001 | Lyons et al. |
| 6,209,259 B1 | 4/2001 | Madigan et al. |
| 6,230,438 B1 | 5/2001 | Zaychuk et al. |
| 6,306,194 B1 | 10/2001 | Wertz et al. |
| 6,309,440 B1 | 10/2001 | Yamashita |
| 6,318,023 B1 | 11/2001 | Yamashita |
| 6,432,156 B1 | 8/2002 | O'Donnell, Sr. |
| 6,464,746 B2 | 10/2002 | Neyman et al. |
| 6,515,177 B1 | 2/2003 | O'Donnell, Sr. |
| 2002/0103086 A1 | 8/2002 | Asrar et al. |
| 2002/0134012 A1 | 9/2002 | Ding et al. |
| 2002/0139046 A1 | 10/2002 | Weber et al. |

OTHER PUBLICATIONS

Ros, C., et al., Seed Sci. & Technolo., 28: pp. 391-401, (2000).
J.E. Matocha, "*Effect of Seed Coating Protectants on Iron Deficiency Chlorosis and Sorghum Plant Growth*", Journal of Plant Nutrition, 15(10), 2007-2013 (1992).
International Search Report dated Aug. 8, 2003.
International Search Report dated Oct. 2, 2003.
International Search Report dated Nov. 13, 2003.

* cited by examiner

SLOW RELEASE NITROGEN SEED COAT

This application claims the benefit of provisional application 60/367,278 filed Mar. 26, 2002 and Provisional application 60/379,402 filed May 13, 2002.

FIELD OF THE INVENTION

The present invention relates to a seed coating for enhancing the delivery of nitrogen needed for plant development and growth. The invention specifically relates to a coated seed having a source of slow release nitrogen as a coating, particularly a particulate source of slow release nitrogen, and to use of the coated seed for enhancing plant development and growth, by delivering nutrient nitrogen over an extended period of time to the growing plant.

BACKGROUND OF THE INVENTION

Through the years, seeds have been coated for a variety of reasons: to provide a uniform seed size so as to facilitate planting (see U.S. Pat. No. 3,905,152), to aid in germination, to inhibit herbicidal damage, to delay germination, to control pests (see U.S. Pat. No. 5,849,320), to retard erosion (see U.S. Pat. No. 4,192,095), to promote water accumulation and absorption and to provide immediate fertilization.

Some coatings are applied merely by dusting the seeds with a particulate solid, which has sometimes been used, for example, to apply a fungicide to seeds. Other coatings are applied using a water-soluble or water dispersible adhesive. Water-based adhesives have often been used because of concerns that a non-aqueous system may damage the seed. Water-based adhesives also have been used to minimize any adverse impact the coating may have on germination. Such adhesives often adhere a particulate material to the seed for any of the above-noted purposes. For example, by including nutrients in the coating, the immediate soil environment of the seed can be favorably changed to promote germination and/or growth of the plant.

One advantage of using an adhesive binder, such as a polymeric material, in the seed coating is that loss of coating material is generally minimized and surface dusting is kept to a minimum.

Porter, F. E., Chemtech, May 1978: 284–287 describes using a two-part polyurethane polymer (polyurea varnish/acetone solvent) to coat legume (alfalfa) seeds with lime. See also U.S. Pat. No. 3,808,740.

Ros, C. et al., Seed Sci. & Technolo., 28: 391–401 describes efforts to coat rice with phosphorus fertilizers using a methyl cellulose glue.

U.S. Pat. No. 4,251,952 describes a seed coating made from an aqueous mixture of sugar and a dispersed preformed water-insoluble polymer, cured simply upon the removal of water, i.e. by drying. Particularly suitable among such preformed polymeric materials are vinyl acetate polymers, especially a vinyl acetate polymer that has been hydrolyzed to form a polyvinyl alcohol. Such polymers are represented by a number of commercially available white glue formulations. The patent also describes adhering an agriculturally acceptable particulate material to the coating simply by mixing the seed with the material after coating but prior to curing (drying).

U.S. Pat. No. 4,735,015 to Schmolka et al., describes enveloping seeds in a protective coating (0.5 to 3.0 mm thick) of a film-forming polyoxyethylene-polyoxybutylene block copolymer. The coating may be applied by depositing a melt of the copolymer on the seed, or by dissolving the copolymer in a solvent, or dispersing it in another liquid and spraying onto the seed. The disclosure suggests that other materials such as inert fillers, moldicides, fungicides and various nutrients such as nitrogen, potassium and phosphorous and salts thereof may also be coated onto the seeds. Such materials can be applied before, after, or with the copolymer. The patent describes alternative methods for coating the seed. Example 12 specifically describes providing a first coating of the copolymer on the seeds followed by a second coating of a 5-10-5 N—P—K fertilizer from an aqueous suspension.

Nitrogen fertilizer is often applied as a formulated (N—P—K) solid, granular or powder, or sometimes as a liquid to an area to be fertilized. The solid form is generally fast release, but it can be made slow release by various coatings. Alternatively, a reduction in nitrogen availability also can be obtained by using enzyme inhibitors. The liquid form may include both fast-acting and slow release forms of nitrogen. Some of the recognized disadvantages of such nitrogen fertilization involve run-off into rivers and streams, ammonia emissions and nitrate leaching.

The seed coat prior art, such as U.S. Pat. No. 4,735,015, however, only describes the use of fast release nitrogen in seed coatings. Unfortunately, only a very small amount of nitrogen can be used in such coatings without burning the seed, or the germinating plant. The prior art does not describe how to introduce a source of slow release nitrogen using a seed coating, as a way to enhance plant development and growth and minimize the problems of run-off and ammonia emission. The present invention proposes to supply a particulate slow-release nitrogen fertilizer as a seed coating.

BRIEF DESCRIPTION OF THE DRAWINGS

The patent or patent application file contains at least one drawing executed in color. Copies of this patent or patent application publication with color drawing(s) will be provided by the Office upon request and payment of the necessary fee.

DETAILED DESCRIPTION OF THE INVENTION

As noted above, the present invention is directed to a coated seed for enhancing the delivery of nitrogen needed for plant development and growth. The invention specifically relates to a coated seed having a coating of slow release nitrogen particles and to the use of the coated seed for enhancing plant development and growth. The slow release nitrogen particles are adhered to the surface of the seed with an adhesive binder formulation, often one that is easily degraded by soil moisture, so as not to interfere severely with seed germination and plant development.

A key constituent of the present invention is slow release nitrogen, urea-formaldehyde (UF) polymer particles. By using a source of slow release nitrogen, upwards of twenty times the amount of nitrogen fertilizer can be supplied through a seed coating than was possible using the common quick release nitrogen fertilizers available in the prior art, without damaging the seed or the early developing plant.

The slow release nitrogen UF polymer particles used in the present invention are prepared by reacting, in an aqueous environment, urea and formaldehyde at a urea:formaldehyde mole ratio of about 1:1. Ammonia may be an optional reactant, as will be understood by those skilled in the art, in an amount of up to about 25% by weight of the formed UF polymer, usually in an amount below about 10% by weight, but in the preferred embodiment of the present invention ammonia is not used at all.

To prepare the UF polymer particles of the present invention, urea and formaldehyde are reacted in admixture at a mole ratio of approximately 1:1, for example at a UF mol ratio broadly in the range of $0.7:1 \leq U:F \leq 1.25:1$ and more preferably in the range of $0.83:1 \leq U:F \leq 1.1:1$. The phase "at a mole ratio of approximately 1:1" is intended to embrace these mole ratio ranges. Particularly good results have been obtained at a U:F mole ratio between 0.95:1 and 1.05:1.

In the initial step of preparing the UF polymer, reaction between urea and formaldehyde is conducted in a manner to produce methylol ureas. Methods of doing this are well known to those skilled in the art and any of such known methods can be used. For example, reaction between the urea and formaldehyde can be promoted by maintaining the aqueous mixture initially at a moderate alkaline pH, with a pH in the range of about 7 to 9 being suitable and with a pH more usually between about 7.5 and 8.5, to promote the formation of methylol ureas. Given urea's inherent level of alkalinity, any required pH adjustment may be accomplished using either an acid or a base. The initial formation of methyol ureas generally can be conducted at a reaction temperature broadly in the range of 70° F. to 175° F. (about 20° C. to about 80° C.), with a reaction temperature in the range of 90° F. to 160° F. (about 30° C. to about 70° C.) more usually employed. The pH may be adjusted using commonly available acids and bases such as sodium hydroxide (caustic) and sulfuric acid. The reaction also may be maintained (buffered) or adjusted by adding such alkaline compounds as triethanolamine, sodium or potassium bicarbonate, sodium or potassium carbonate, or other alkali metal hydroxides, such as potassium hydroxide and lithium hydroxide. Alternatively (though not generally preferred), the methylolation may also be done at an acidic pH, such as in the pH range of 5.0 to 6.0, as will be recognized by those skilled in the art and the present invention is not limited by the way the initial methylolation is conducted.

Following the initial formation of methylol ureas, the nascent UF polymer then is condensed to the point where the polymer becomes insoluble in the aqueous environment. This result is preferably accomplished by rapidly acidifying the methylol ureas, to a pH below about 6, preferably below about 5 and usually to a pH below about 4, but above about 1. A pH in the range of 2.5 to 4.0 has proven to be suitable. Any organic or inorganic acid that will lower the pH can be used. Particularly suitable is a strong acid, such as a mineral acid and an organic acid such as the stronger carboxylic acids. Thus, suitable acids include formic acid, acetic acid, nitric acid, phosphoric acid, sulfuric acid and hydrochloric acid. However, in its broadest aspects the present invention is not limited by the way the further polymerization of the methylol ureas and ultimate insolubilization is conducted and obtained.

In order to produce a useful range of UF polymer particle sizes, the aqueous mixture of the methylol ureas is preferably mixed in the presence of a dispersing agent during the acidification step, although it should be possible to get a similar result by maintaining a sufficiently high level of agitation during the reaction in the absence of any dispersing agent. The resulting dispersion of UF polymer particles formed from the polymerization that occurs, for example, following acidification, can then be used directly (possibly following some thickening, or concentration enrichment), i.e., as a dispersion, to coat the seed, or alternately (and preferably) can be recovered or isolated from the dispersion to produce a UF polymer powder, which then is used to formulate the coating. In any event, the UF particulates formed in this manner have approximately 36% nitrogen.

Particularly in the preferred embodiment, most of the nitrogen is chemically bound in the UF polymer particulates and thus is agronomically unavailable until microorganisms, principally bacteria, enzymatically (e.g., using urease and nitrogenase) degrade the polymer into a form useable by the growing plant. It is this property that leads to labeling the UF polymer "slow release" or "extended release." A small amount of the nitrogen, typically on the order of 5% by weight of the particulate, may be of the fast or quick release variety (e.g., principally unreacted urea) and thus may be immediately available to the seed/plant. Because the UF polymer has only about 5% quick release nitrogen, however, the chance of over fertilization using the preferred coated seed of the present invention is minimal. However, if desired, the reaction conditions (including the mole ratio of reactants) and/or the extent of the reaction also can be adjusted such that a higher amount of free urea is present in the UF particles, as a way to deliver more immediately available nitrogen for a quicker initial development or greening effect. Such adjustments are well within the skill of the art in view of the present disclosure.

Skilled practitioners recognize that the formaldehyde and urea reactants used to make the UF polymer of this invention are commercially available in many forms. Any form of these materials, which can react with the other reactant and which does not introduce extraneous moieties deleterious to the desired reaction and reaction product, can be used in the preparation of the slow release nitrogen, urea-formaldehyde polymer particles of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used sources of formaldehyde. Formaldehyde also may be available as a gas. Each of these sources of formaldehyde is suitable for use in the preparing the UF polymer of this invention. Generally, for ease of use, formalin solutions are preferred as the formaldehyde source. In addition, some of the formaldehyde may be replaced with another aldehyde, such as acetaldehyde and/or propylaldehyde that can react with urea. Glyoxal may also be used in place of formaldehyde, as may other aldehydes not specifically enumerated.

Urea also is available in many forms. Solid urea, such as prill, and urea solutions, typically aqueous solutions, are commercially available. Further, urea often is chemically combined with formaldehyde in the form of a urea-formaldehyde concentrate, such as UFC 85, or as a commercially-available solution containing about 25 weight percent urea, about 60 weight percent formaldehyde, and about 15 weight percent water, available under the trademark STA-FORM 60.® Each of these sources of urea can be used in preparing the UF polymer of this invention.

The urea-formaldehyde condensation reaction that results in the UF polymer particles of this invention is preferably conducted in an aqueous environment. As noted above, the reaction is conducted until the growing urea-formaldehyde polymer becomes insoluble in the aqueous reaction medium. A dispersing agent is preferably included in the water to facilitate the production of small polymer particles by the reaction. One suitable dispersant is the line of DAXAD dispersants commercially available from Hampshire Chemicals, a subsidiary of the Dow Chemical Company. One of the classes of these dispersants is a condensed naphthalene sulfonate. Both the high and low molecular weight species of this product line have been shown to be suitable, such as DAXDAD 19. A variety of other dispersants, or surfactants also can be used, including those that might be classified as anionic, such as polyacrylates (also available under the DAXAD label—such as DAXAD 30 from Hampshire Chemicals). Nonionic and cationic dispersant compounds also can be used. Suitable alternative materials can be identified using routine experimentation. The nature of the specific dispersant/surfactant is not critical. Another example would be a lignosulfonate salt or lignin. It is also possible to dispense with the use of any dispersant, provided that the reaction medium is sufficiently agitated (high shear) during the UF condensation reaction to promote the formation of small polymer particles.

The amount of dispersant to include in the aqueous solution of methylol urea at the time of the insolubilization reaction can be readily determined by those skilled in the art. The amount depends to some extent on the particular dispersant chosen to use and the concentration of methylol urea in the aqueous reaction medium. Generally, the urea and formaldehyde reactants and the water vehicle are provided in amounts to yield a methylol urea concentration that ultimately provides a dispersion of UF polymer particles at about a 20% by weight solid concentration up to about 60% by weight solids. More usually, the materials are provided so that the UF polymer dispersion is between about 30% and 55% by weight solids. Preferably, the dispersion of UF polymer particles is prepared at about a 40% by weight solids concentration. Under these conditions, the dispersing agent is generally supplied at a concentration of between about 0.1% and 5% by weight, and usually in at least about 0.5% by weight up to about 2% by weight.

The particle size of the UF polymer particulate material may vary fairly widely, but in general is smaller than the seed itself and usually is substantially smaller than the seed. Producing small UF particles helps one better obtain a necessary and desired degree of adhesion of such particles to the seed. Most UF particles will be sufficiently small so as to pass through a 100 mesh (U.S. or Tyler) screen, and generally will have at least a major portion also passing through a 200 mesh screen. Thus, most of the UF polymer particles will be smaller than about 150 microns and a large number of them may be smaller than about 75 microns. While there is virtually no lower limit to the UF polymer particle size for practicing the invention; as a practical matter, most particles will be larger than one micron. Most of the particles, prepared using the procedures and materials noted above, have a particle size in the range of 10 to 80 microns, with a number average particle size between about 25 and 35 microns. A number average particle size of about 30 microns is quite common.

In the broad practice of this invention, the aqueous dispersion of UF polymer particles can be used directly for coating seeds, or the solid UF particles could be isolated from the dispersion before adhering them to seeds. In some cases, it may be easier and more cost effective to use the dispersion directly. However, if there is a desire to isolate the particles, and that may be preferred in some cases, then, any way for isolating the UF polymer particles from the aqueous UF polymer dispersion can be used. For example, the UF polymer particles in the dispersion may be isolated by filtration and oven drying, or by thin film evaporation. When using these latter techniques, it may then be necessary to reduce the particle size of the recovered solids, for example by grinding, to obtain a desired particle size or size distribution for a specific seed coating.

Another, often preferred, way of isolating or recovering the UF polymer particles from the UF dispersion formed by the polymerization of urea and formaldehyde as described above, is by spray-drying. As used herein, the terms "spray dryer" and "spray drying" refer to the technically sophisticated process of atomizing (in the form of finely divided droplets) the UF dispersion or slurry into a gas stream (often a heated air stream) under controlled temperature conditions and under specific gas/liquid contacting conditions to effect evaporation of water from the atomized droplets and production of a dry particulate solid product. Spray drying as used herein is typically carried out with pressure nozzles (nozzle atomization) or centrifugal atomizers operating at high speeds (e.g., a spinning disc). Despite the high velocity generation of droplets, a spray dryer is designed so that the droplets do not contact the spray dryer wall under proper operating procedures. This effect is achieved by a precise balance of atomizer velocity, air flow, spray dryer dimensions of height and diameter, and inlet and outlet means to produce a cyclonic flow of gas, e.g., air in the chamber. A pulse atomizer also can be used to produce the small droplets needed to facilitate evaporation of the water. In some cases, it may be desirable to include a flow promoter, such as an aluminosilicate material, in the aqueous dispersion that is processed in a spray dryer simply to facilitate subsequent handling and transport of the spray dried UF powder (e.g., to avoid clumping).

In the broad practice of this invention, either the aqueous dispersion of slow release nitrogen particles itself, or more preferably the isolated, powdered UF polymer, slow release nitrogen, recovered from the aqueous dispersion then is coated onto and bonded onto seeds using a suitable adhesive binder.

In the broad practice of this invention, the nature of the adhesive binder is not narrowly critical. Any non-toxic, biocompatible adhesive material should be suitable. For the most part, any of the wide variety of adhesive materials conventionally used in connection with seed coating in the prior art should also be suitable for use in connection with the present invention and the present invention should not be limited to any specific adhesive binder. One important property of the adhesive binder, described in more detail below in connection with various coating techniques, is that that adhesive cure below a temperature that would damage or degrade the viability of the seeds themselves.

Generally, it will be desirable to use an adhesive that provides a tough and hard coating so that the UF polymer particulate solids are not easily eroded from the surface of the seed during shipping, storage and handling. However, as a general rule the coating should also have a sufficient aqueous solubility so as to degrade readily after seed planting and not interfere with germination of the seed (unless one also is intentionally seeking a delayed germination).

Based on these characteristics, adhesive classes which can potentially be used as the adhesive binder in the seed coating of the present invention are quite broad and include, but are not limited to, animal hide glues, celluloses including ethyl celluloses, methyl celluloses, hydroxymethyl celluloses, hydroxypropyl celluloses, hydroxymethyl propyl celluloses, carboxy methyl celluloses, polyvinyl alcohols and polyvinyl alcohol copolymers, dextrins, malto-dextrins, alginates, sugars, molasses, polyvinyl pyrrolidones, polyvinyl acetates and polyvinyl acetate copolymers, polysaccharides, fats, oils, proteins, gum arabics, shellacs, vinylidene chlorides, vinylidene chloride copolymers, lignosulfonates, starches, acrylate polymers and copolymers, such as polyvinyl acrylates, zeins, gelatins, chitosan, polyethylene oxide polymers, acrylamide polymers and copolymers, polyhydroxyethyl acrylates, methylacrylamide polymers, polychloroprenes, poly (methyl vinyl ether)maleic anhydride copolymers, vinylpyrrolidone/styrene copolymers, vinyl acetate/butyl acrylate copolymers, styrene/acrylic ester copolymers, vinyl acetate/ethylene copolymers and polyurethane polymers. Crosslinkable silicone materials as described in U.S. Pat. No. 4,753,035 also can be used. Still other materials, including natural inorganic materials such as silica gel and clay may also be suitable in some applications as will be readily apparent to those skilled in the art.

The preferred adhesive binders are latex materials. Latex is a general term for a more or less stable emulsion of a polymer in water, e.g. an aqueous emulsion or suspension. The term includes such materials as butadiene and styrene copolymers (elastomeric), stryene-butadiene copolymers (resinous), butadiene with styrene and acrylonitrile, chloroprene copolymers, methacrylate and acrylate polymers and copolymers, including acrylate ester copolymers, vinyl acetate copolymers, vinyl and vinylidene chloride copolymers, ethylene copolymers, fluorinated copolymers, acrylamide polymers and copolymers, stryrene-acrolein copolymers, and pyrrole polymers and pyrrole copolymers. These polymeric materials can be modified to have active groups such as carboxy groups. Acrylic emulsions such as the Titan line of materials available from Parachem, especially Titan T-6330, and polyacrylamide emulsions have been shown to give particularly desirable seed coatings.

As noted above, generally, the adhesive binder normally, though not always, is selected so as not to interfere with germination of the seed. Many of the preferred adhesives are sufficiently hydrophilic to be readily dissolved by soil moisture, allowing emergence of the radicle and cotyledon of the emerging plant in a time period consistent with germination of uncoated seed.

Some of the factors to consider when selecting an adhesive binder are its viscosity, its rate of cure, or rate of drying, the temperature needed to cure the adhesive and its final moisture content after cure or drying. Some of these factors, such as the cure time and moisture content may also be influenced by other parameters such as whether, what types and what amounts of particulate materials are used in the final coating in addition to the UF particles. In general, it is desirable to have an adhesive binder, which cures relatively fast. In some cases, however, a binder that cures less quickly may be desired. For example, a binder that does not quickly cure may be preferred if one seeks to adhere particles to the coating after the binder has already been applied to the seed. A binder which cures too quickly might leave insufficient time in the uncured tacky state to add and/or adhere the particulates, such as the UF polymer powder material to the coating, if such a method of coating which relies on surface tackiness is desired. Thus, it may in some cases be preferable for the adhesive binder to have a minimum water content, such that the adhesive binder composition will remain tacky for a minimum period of time after application to the seed.

Higher viscosity adhesive formulations also may be desirable with certain seeds, such as grass seeds, to avoid unnecessary, excess penetration of the adhesive into the porous seed surfaces. It also may be desirable to form an agglomerate of the coating composition and several seeds so that the coated seed has a particle size significantly larger than individual seeds. The desired solids and water content of the adhesive binder therefore may be a matter of balancing of the various factors including the adhesive binder material itself which usually has its own individual physical characteristics which influence viscosity and other properties. In any event, the preferred levels for each situation can be readily determined by simple routine experimentation.

The amount of the adhesive binder applied to the seeds will be determined by a number of known parameters such as its type and solids content, the type of seeds to be coated, the thickness of the desired coating, and the desire (or lack thereof) to form an agglomerate of multiple seeds and thus the amount of adhesive may vary widely. As one skilled in the art can appreciate the exact amount also will vary depending on the size of the seed to be coated. Often an amount of adhesive binder will be used which completely coats substantially all available seed surfaces. An excess of adhesive should be avoided in some cases as this may contribute to undesired agglomeration during preparation of the coated seed, such as following addition of the slow release nitrogen UF polymer particulate material. A larger amount of the adhesive may be necessary as larger amounts of UF polymer particulate material, or other particulate material, is to be added to the coating, or If some level of agglomeration is desirable.

In general, the amount of the adhesive in any coating formulation for most applications is in the range of from 0.01 to 100 parts, more often from 0.1 to 100 parts dry adhesive binder solids per 100 parts by weight seed, such as 0.5 to 10 parts dry adhesive binder solids per 100 parts by weight of seed, more usually about 0.5 to 50 parts dry adhesive binder solids per 100 parts by weight of seed, such as from about 1.0 to 7.0 parts of dry adhesive solids per 100 parts of seed.

In terms of an aqueous adhesive binder (latex) itself, which when used is usually supplied as about a 25–50% by weight emulsion, the amount thereof for most applications is in the range of from 0.1 ml to 100 ml per 100 parts by weight of seed, such as from 1 ml to 40 ml per 100 parts by weight of seed, more usually 1 ml to 50 ml per 100 parts by weight of seed, such as 2 to 25 ml of aqueous adhesive per 100 parts by weight of seed.

Usually, on a dry solids basis, the adhesive binder will comprise from about 0.1 to 100%, such as from 1 to 10% by weight, most often from about 1 to 50%, such as from 3 to 7% of the seed coating, with the remainder generally being solid particles, especially the UF polymer particles of the invention.

In addition to the slow release nitrogen, UF polymer solid particles, a variety of other additives, including other agriculturally acceptable particulate materials, may also be bonded to the seeds by the adhesive binder component of the seed coating. While some materials, which exhibit a high degree of water solubility, may be mixed with the UF polymer dispersion, such as prior to spray-drying, or with an aqueous adhesive binder composition prior to its introduction as part of the coating, for the most part such adjuvants will be introduced into a coating formulation, or during the coating process much like the UF polymer particulates themselves.

Such materials may essentially be any finely divided material commonly used in fertilizer applications that is not toxic to the seed, or harmful to the soil environment in which the seed is to be planted. Such particulates may include calcium carbonate (agricultural lime) in its various forms for adding weight and/or raising the pH of acid soils in the environment of the seed; metal containing compounds and minerals such as gypsum, metal silicates and chelates of various micronutrient metals such as iron, zinc and manganese; talc; elemental sulfur; activated carbon, which may act as a "safener" coating to protect the seed against potentially harmful chemicals in the soil; pesticides, herbicides and fungicides to combat or prevent undesired insects, weeds and disease, super absorbent polymers, wicking agents, wetting agents, plant stimulants to accelerate growth, inorganic (N—P—K) type fertilizers, sources of phosphorus, sources of potassium, and organic fertilizers, such as urea as a way to deliver more immediately available nitrogen for a quicker initial greening effect. Mixtures of these different particulate materials may of course be employed and the same seeds may be given multiple coatings with the same or different particulate materials used in different particulate layers.

The most important macronutrients are nitrogen, phosphorus, potassium and calcium but in many instances it may be worthwhile that others also be present in the composition. The more important micronutrients are zinc, iron and manganese, but as with the macronutrients it may be worthwhile in some circumstances that others also be present. Phosphorus can be conveniently added as free phosphoric acid, or as a substituted salt of an inorganic or organic phosphorus-containing acid. Potassium is conveniently added as potassium hydroxide or as a potassium containing salt. In this regard, the disclosure of U.S. Pat. No. 5,797,976, which provides an extensive list of nutrients and other plant growth adjuvants for enhancing the growth and development of plants, is herein incorporated by reference in its entirety for its disclosure.

The amount of particulate material, including especially the UF polymer particles of the invention, added and adhered to the coated seed surface may vary fairly widely, but will usually depend on the particular seed being coated and the optional presence of other particulates and solids besides the essential UF polymer particles of the present invention. The amount of the adhesive binder used in the coating on the seed surface also is a factor that can influence the amount of particulate UF polymer (or other particulate material) that can be effectively added and adhered to the seed.

In terms of weight amount, a general range is from 0.1 to 1000 parts, or from 0.5 to 1000 parts by weight UF polymer particles, such as 1 to 300 parts by weight of UF polymer particles (optionally with other particulate additives) per 100 parts by weight of seed to form the coating adhered to the seed surface. More usually, an amount of 0.1 to 300 parts, or from 1 to 250 parts by weight UF polymer particles, such as 10 to 200 parts by weight of UF polymer particles (optionally partially replaced with other particulate additives) per 100 parts by weight of seed will be used.

It is not necessary that the amount of particulate UF polymer material be at a level sufficient to satisfy the full adherence capacity of the liquid adhesive coating on the seed and minor amounts of from about 3 to less than 10 parts of particulate UF polymer material may be used in some cases.

The particulate slow release nitrogen solids and any additional adjuvants are then attached to the seed using the adhesive binder coating component.

A variety of procedures, both batch and continuous in operation, can be used to provide the coating of the slow release nitrogen UF polymers particulate solids on the seeds. Seeds may be coated in a single step, or by a multi-stage process. The present invention is not to be limited to any particular technique. The seed and coating constituents can be mixed in any of the variety of commercially available seed coating equipment such as equipment commercially available from SATEC of Elmshorn, Germany. Alternatively, see, for example, continuous coating machines described in U.S. Pat. No. 5,494,709 and U.S. Pat. No. 5,443,637 assigned to Coating Machinery Systems (CMS), a subsidiary of Vector Corporation.

In one approach, the adhesive binder can be applied to the seed by spraying in a first stage followed by a second stage in which the slow release nitrogen UF polymer particulate solids, along with any other particulate additives, are applied by dusting and attached by the adhesive binder to the seed. Each stage may consist of a shallow fluidized bed of seed on a horizontally moving conveyor. The drying, or curing rate of the adhesive coating is manipulated so that the solid nitrogen UF polymer particulates suitably adhere to the seeds, while avoiding excessive agglomeration of the seeds during the coating process.

Another suitable seed coating procedure is illustrated in U.S. Pat. No. 2,648,609, and in U.S. Pat. No. 3,911,183 wherein an air stream is moved in a confined space upwardly past seeds with a force sufficient to suspend (fluidize) them continuously. A coating fluid (adhesive binder, or a mixture of adhesive binder and UF polymer dispersion) in the form of an atomized mist is introduced into the gas, e.g., air stream prior to its contact with the seeds. By heating the air stream, the adhesive coating applied to the seeds can be dried quickly. In this regard, heated air can be forced through the seed using a blower to maintain the fluidized bed of seed at a temperature of from about 80° to 120° F. (25° to 50° C.). The fluid, such as the adhesive binder, is atomized through a spraying nozzle and is deposited on the seed in thin layers, which dry quickly under the influence of the hot gas, e.g., air. The rapid drying provides a cooling effect, which helps to prevent overheating of the seed. The desired amount of adhesive binder in the coating can be obtained by applying a plurality of thin, consecutive layers of the aqueous, e.g., binder material. Any particulate solids, including the essential UF polymer particulates if supplied as a dry powder, can, in some cases, be introduced in admixture with the adhesive binder and in other cases will be introduced into the coating zone with the seeds through a separate stream.

Another available coating procedure uses a rotary drum, such as a tilted drum. The seed is tumbled within the drum while a coating formulation of the adhesive binder, possibly with the UF polymer dispersion, is sprayed onto the agitated seed. Usually, a stream of hot gas, e.g., air is directed at the seeds to facilitate drying of the coating. The inlet air temperature and the feed rate of the coating formulation are controlled so that the temperature of the tumbling bed of seeds is maintained between about 80° to 120° F. (25° to 50° C.). As with the previous method, a suitable temperature will depend on the seed being coated and the particular coating formulation being applied. Again, the particulate UF polymer solids can be introduced with the adhesive or in a separate stream of solids with the seed.

Another common seed coating procedure uses a tilted pan, as described in U.S. Pat. No. 2,999,336. Various other tilted pan-type arrangements, may also be employed. All are well known to those skilled in the art. Indeed, for some seeds, it may be best to use a rotating-type coating pan operated at a sufficient RPM to maintain a rolling action of the seed and particulate solids along the sides of the pan.

This allows uniform coverage and compaction of the applied adhesive binder. In this embodiment, the adhesive binder solution or dispersion can be applied over a period of time to allow sufficient drying between applications to minimize blocking or clumping of the seeds. An increased rate of application can be facilitated by using forced, preferably heated, air in the coating pan. After applying a sufficient amount of adhesive binder to bind the UF polymer solids and any additional adjuvants to the seed, the seed must be cooled to minimize blocking in the bin or bag.

The step of adding the particulate UF polymer particulate material to the seeds can be conveniently commenced before contacting the seeds with the adhesive binder, as soon as the seeds have been coated with the adhesive binder or soon thereafter. In any event, the seeds, the UF polymer particles, other optional particulates and the adhesive binder are brought together while the adhesive remains in a liquid or tacky state. Addition of the UF polymer particulate material may take place within a very short time after the initial addition of the adhesive coating to the seeds, and under preferred conditions is usually effected within 10 minutes after such addition, more usually within 5 minutes, and often within a matter of even a few seconds. The UF polymer particulate material, depending upon the type of processing employed, may be added while the seeds are in the static state or while the seed mass is in motion or otherwise being mixed or agitated. Similarly depending upon the method employed, the particulate UF polymer material may be added all at once, or at controlled rates in the form of a stream or preferably a more distributed mass as obtained, for example, by metering or shaking of the particulate material onto the seed.

In all of these coating options, care should generally be exercised to ensure that the seed temperature does not rise significantly above a temperature which would degrade the seeds ability to germinate, for example above about 120° F. (about 50° C.), for a lengthy period of time. Prolonged exposure of the seeds to higher temperatures, increases the risk that the seeds will be significantly degraded. Higher temperature exposure also should be avoided because it may be above the softening point of the adhesive binder used to adhere the slow release nitrogen UF polymer coating material to the seeds. Under such conditions the coated seeds may undesirably stick together.

It also is important, in many of these coating embodiments, that the temperature not be significantly below about 80° F. (about 25° F.). At lower temperatures, aqueous adhesive coatings may not dry fast enough to prevent the coated seeds from agglomerating (unless agglomeration is desired). A suitable temperature for performing any particular seed coating operation may be determined by a simple preliminary experiment taking into account the particular seed to be coated and the adhesive binder material to be used.

The addition of the particulate UF polymer material, and any other particulates, during the coating process substantially shortens the time within which the adhesive coating and the resulting coated seed product becomes sufficiently non-tacky as a whole so that mixing of the seeds can be stopped and the seed mass can be allowed to rest without undesirable agglomeration of the seeds. It is therefore generally desirable to add the particulate UF polymer material in amounts which have a substantial effect on reducing processing time, which in most cases is from about 1 to 1000 parts by weight UF polymer per 100 parts by weight of the originally uncoated seed, such as 20 to about 200 parts by weight of UF polymer powder per 100 parts by weight of the originally uncoated seed.

Figure 2:
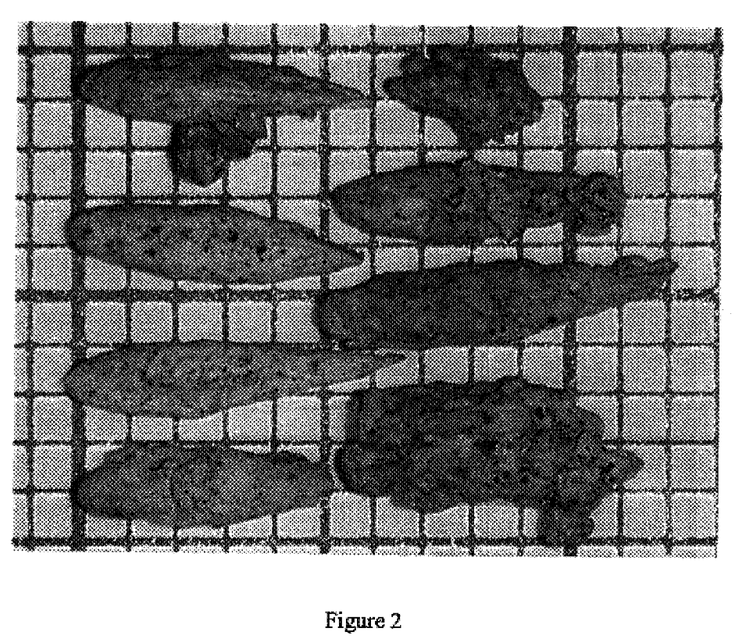
FIG. 2 is a photomicrograph of tall fescue seeds having an adherent coating containing slow release nitrogen particles in accordance with the present invention.

The present invention is useful with all seeds, including seeds used to grow crops for human consumption, for silage, or for other agricultural uses. Indeed, virtually any seed can be treated in accordance with the invention, such as cereals, vegetables, ornamentals, and fruits. It is expected that its principal use will be with seeds of plants that reach maturity in one growing season. One major application will be for grass seed. FIG. 2 is a photomicrograph of tall fescue grass seeds having a coating containing the UF polymer powder of the present invention. In the photograph, each square is 1 square millimeter in area. Other seeds that can be coated include grains such as barley, oats and corn, sunflower, sugar beets, rape, safflower, flax, canary grass, tomatoes, cotton seed, peanuts, soybean, wheat, rice, alfalfa, sorghum, bean, broccoli, cabbage and carrot. Tobacco and flower seeds, for example, pansy, impatiens, petunia and geranium, seeds may also be treated. The most preferred seeds include grass, corn and soybean.

A coloring agent also may optionally be added to the adhesive binder to make the seed easier to see and/or to improve the appearance of the seed. The coloring agent may be used to make it easier for farmers to easily identify the type of seed. The colorants can be either organic or inorganic and should be non-toxic. Examples of organic colorants are azo dyestuffs and phthalocyanine blues and greens. Examples of inorganic colorants are titanium dioxide (white) or ochers (yellow) and iron oxides (red). The colorant may be a dye and can be selected from the group of acetate dyes, anthraquinone dyes, acid dyes or azo dyes. Specific examples of acceptable coloring agents include the dyes, green #7 and red #48. These dyes are commercially available from dye manufacturers and are well known to those of ordinary skill in the art. The dye may comprise from about 0.5% to about 10% w/w of the coating. Generally, the amount of coloring agent is between about 1–2%.

Other coating additives include surfactants, initiators, stabilizers, cross linkers, antioxidants, UV stabilizers, reducing agents, colorants and plasticizers.

The thickness of the final seed coating will vary with the type of seed, the desired loading of the UF polymer particles and the amount of adhesive binder. Usually, the coating thickness will range between about 10 to 1000 microns, most often between about 20 to 500 microns.

The coated seed of the present invention can be sown using any know technique, such as hand seeding, "hydroseeding," machine seeding and the like. For certain seeds, such as grass seed, it may be preferred in some case to use mats that form artificial seedbeds. Many forms of artificial seedbeds, including seed mats and carpets, intended for growing grass and other forms of vegetation are available the art. A conventional seed mat is disclosed, for example, in U.S. Pat. No. 4,190,981 issued to Muldner. This particular seed mat includes a base layer of water pervious web material, a bed of seeds and compressed peat particles as a middle layer, and an upper layer comprising a fibrous, porous veil. Preferably, the seedbed provides an matrix that enhances safe sprouting and growth of young vegetation, and which is porous enough to allow roots to extend through it, yet strong enough to support the seeds and retain some of the temperature and humidity of the soil around the seeds during seed germination and growth. One preferred design comprises a rolled product that carries seed and fertilizer contained in a biodegradable matrix of cellulose fibers and a biodegradable binding adhesive as described in pending Provisional application Ser. No. 60/446,514.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

EXAMPLE 1

A urea-formaldehyde (UF) dispersion, suitable for producing UF polymer particles used in making a coated seed of the present invention, is prepared as follows. Water (32.3 parts by weight) and a 50% aqueous solution of formaldehyde (31.8 parts by weight) are added to a reaction vessel equipped with vacuum reflux, a heater and a mixer. While adjusting the temperature of the agitated aqueous mixture to 100° F., its pH is also adjusted to about 7.0 (6.8 to 7.2) using either 50% caustic (NaOH), or 35% sulfuric acid, as needed. Once the aqueous mixture has been heated to 100° F. (about 38° C.), 31.8 parts by weight of prilled urea also is added and mixing is continued. The temperature of the agitated aqueous mixture then is increased to 120° F. (about 50° C.) and held for a time (usually about 15 minutes) sufficient to dissolve the urea. While maintaining the temperature of the agitated mixture at 120° F. (about 50° C.), the pH is adjusted to within the range of 8.0 to 8.4, again using either 50% caustic (NaOH), or 35% sulfuric acid as needed. Using, as appropriate, a combination of the reaction exotherm and external heating, the reaction mixture is heated to a temperature of 158° F. and the temperature is controlled using vacuum reflux. The pH of the mixture is adjusted, as needed, to about 7.8 to 8.2, using either 50% caustic (NaOH), or 35% sulfuric acid. The agitated mixture is held at a temperature of about 158° F. (70° C.) for about 30 minutes and the pH continues to be adjusted, as needed, to about 7.8 to 8.2, using either 50% caustic (NaOH), or 35% sulfuric acid so that the reactants form methylol ureas. While continuing agitation, the aqueous mixture is cooled to about 105° F. (about 40° C.) and a dispersant (one part by weight of DAXAD 19) is added while the batch is cooled. Upon reaching 105° F. (about 40° C.), the batch is placed under full vacuum. While maintaining full vacuum and applying cooling to the agitated batch, the pH of the aqueous mixture is adjusted, as quickly as possible, to a pH of about 3.3 to 3.5, using 35% sulfuric acid, at which point the batch may exotherm to a temperature of above 175° F. (about 80° C.) before the exotherm subsides. This procedure causes rapid condensation of the methylol ureas to a solid network polymer. After completing the pH adjustment, the temperature of the aqueous mixture is cooled to 105° F. (about 40° C.) as quickly as possible while it is held for 20 minutes. Following the 20 minute holding period, the pH of the aqueous mixture is adjusted to 6.5 to 7.5, using either 50% caustic (NaOH), or 35% sulfuric acid, as needed, and then is discharged to storage. The UF polymer dispersion at about 38 wt. Percent solids should be agitated during its storage.

EXAMPLE 2

The dispersion made in accordance with Example 1 can then be spray dried to produce UF polymer particles suitable for making coated seed in accordance with the present invention. A Niro P6 spray dryer can be fed with 15 pounds per hour of the dispersion of Example 1. The spray dryer receives an inlet gas stream at a flow rate of about 415 standard cubic feet per minute and a temperature of 330–340° F. (165–170° C.). The outlet temperature of the spray dryer was measured as 75–95° F. (25–35° C.). The recovered UF polymer particle product (at about 1 wt. % moisture) had particle sizes distributed from 10 to 80 microns, with a number average size of 30 microns.

EXAMPLE 3

Using a Niro industrial-sized spray dryer (ON 030-5051), a UF polymer dispersion made in accordance with Example 1 having about a 38 wt. % solids content, at a temperature of 28° C. and at a feed rate of 100 lbs/minute was spray-dried with the atomizer wheel operating at 13,000 RPMs. Air, at a flow rate of 49,400 standard cubic feet per minute and at a temperature of 186° C. was delivered to the spray dryer. The outlet air temperature measured as 88° C. Spray-dried UP polymer particles were recovered from the spray dryer.

EXAMPLE 4

Figure 1:
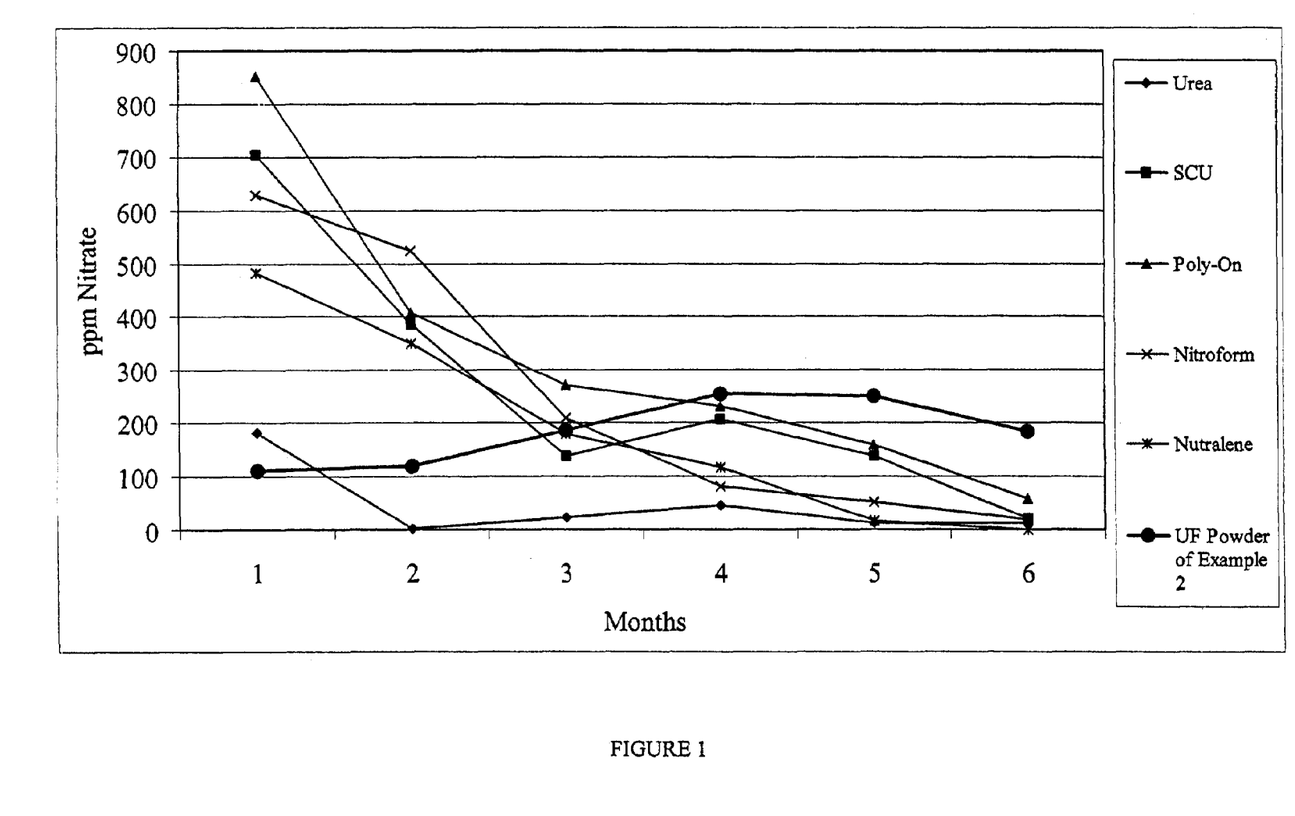
FIG. 1 is a graph showing the lysimeter results (nitrogen release rate) over a six (6) month time period for the UF polymer powder of the present invention as compared with several commercially available sources of nitrogen fertilizers.

In order to assess the release performance of the UF powder used to prepare the coated seed of the present invention, the sprayed dried UF powder product of Example 3 was tested in an incubation lysimeter, a procedure developed by Dr. Jerry Sartain of the University of Florida. An individual lysimeter is simply a 12 inch long piece of 3" diameter PVC piping. The pipe has a permanent cap on the bottom and a removable cap on the top. The bottom cap has an opening where water can drain and vacuum can be applied to remove excess water. A sand-soil mixture is prepared by mixing ninety-five (95) parts sand and five (5) parts topsoil. An amount of the sand-topsoil mixture sufficient to fill the column then is mixed thoroughly with an amount of each of the fertilizers to be tested sufficient to provide 450 mg of nitrogen in the column. After filling the lysimeter column, enough water is added to moisten the column contents. The column then is ready for the start of the testing. Once a month, 500 milliliters of 0.01M citric acid is added to the column, allowed to flow downwardly through the column, and is collected from the bottom drain. Any excess water (citric acid) is removed from the column using a vacuum and combined with the amount collected from the drain. The collected liquid is analyzed for nitrogen (nitrate and ammonia) content. The amount of nitrogen (nitrate and ammonia) eluted from the column each month is determined. In addition to the UF powder of Example 6, sulfur coated urea (SCU), a polymer coated urea (Poly-On), a low molecular weight methylene urea (Nitroform) and an even lower molecular weight methylene urea (Nutralene) also were tested. Each material was tested in triplicate and the results of the testing are illustrated in the FIG. 1. The graph of FIG. 1 plots the total nitrate released each month (average of three replicates) over a six month period of time. As shown, the UF powder had the lowest level released in the first month and then sustained the highest levels of release in the fourth, fifth and sixth months. Furthermore, as shown by the release curve in FIG. 1, the release rate of nitrogen (as nitrate) from the UF polymer particles of the present invention is substantially uniform (constant) over a period of six months.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5%.

We claim:

1. A plant seed having an adherent coating thereon comprising an adhesive binder and a particulate urea-formaldehyde polymer, wherein the particulate urea-formaldehyde polymer comprises from 50% to about 99% by weight of the adherent coating.

2. The plant seed of claim 1 wherein the particulate urea-formaldehyde polymer is made by acidifying an aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

3. The seed of claim 2 wherein the aqueous methylol urea solution is made by reacting urea and formaldehyde at a urea:formaldehyde mole ratio of approximately 1:1.

4. The seed of claim 3 wherein the aqueous methylol urea solution is made by reacting urea and formaldehyde at a urea: formaldehyde mole ratio of 0.83:1 to 1.1:1.

5. The seed of claim 2 wherein the methylol urea solution is made by reacting urea and formaldehyde at a urea:formaldehyde mole ratio of 0.95:1 to 1.05:1.

6. A plant seed having an adherent coating thereon comprising an adhesive binder and a particulate urea-formaldehyde polymer having a particle size substantially between 1 and 150 microns, wherein the adhesive binder is applied to the seed as a latex and dried and wherein the particulate urea-formaldehyde polymer is made by acidifying an aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

7. The seed of claim 6 wherein the latex is selected from the group consisting of an acrylic polymer emulsion and a polyacrylamide polymer emulsion.

8. A plant seed having an adherent coating thereon comprising an adhesive binder and a particulate urea-formaldehyde polymer having a particle size substantially between 1 and 150 microns, wherein the particulate urea-formaldehyde polymer is made by acidifying an aqueous methylol urea solution made by reacting urea and formaldehyde at a urea:formaldehyde mole ratio of 0.95:1 to 1.05:1 and wherein the methylol urea solution contains a dispersing agent during the acidifying.

9. The seed of claim 8 wherein the dispersing agent is selected from the group consisting of a condensed naphthalene sulfonate, a polyacrylate, a lignosulfonate salt and lignin.

10. A method of enhancing the growth and development of a plant grown from seed comprising providing said seed with an adherent coating thereon comprising an adhesive binder and a particulate urea-formaldehyde polymer prior to planting said seed, wherein the particulate urea-formaldehyde polymer comprises from 50% to about 99% by weight of the adherent coating.

11. The method of claim 10 wherein the particulate urea-formaldehyde polymer is made by acidifying an aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

12. A method of enhancing the growth and development of a plant grown from seed comprising providing said seed with an adherent coating thereon comprising an adhesive binder and a particulate urea-formaldehyde polymer having a particle size substantially between 1 and 150 microns prior to planting said seed, wherein the adhesive binder is applied to the seed as a latex and dried and wherein the particulate urea-formaldehyde polymer is made by acidifying an aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

13. The method of claim 12 wherein the latex is selected from the group consisting of an acrylic polymer emulsion and a polyacrylamide polymer emulsion.

14. The method of claim 11 wherein the methylol urea solution is made by reacting urea and formaldehyde at a urea:formaldehyde mole ratio of approximately 1:1.

15. The method of claim 14 wherein the methylol urea solution is made by reacting urea and formaldehyde at a urea: formaldehyde mole ratio of 0.83:1 to 1.1:1.

16. The method of claim 11 wherein the methylol urea solution is made by reacting urea and formaldehyde at a urea:formaldehyde mole ratio of 0.95:1 to 1.05:1.

17. A method of enhancing the growth and development of a plant grown from seed comprising providing said seed with an adherent coating thereon comprising an adhesive binder and a particulate urea-formaldehyde polymer having a particle size substantially between 1 and 150 microns prior to planting said seed wherein the particulate urea-formaldehyde polymer is made by acidifying an aqueous methylol urea solution made by reacting urea and formaldehyde at a urea: formaldehyde mole ratio of 0.95:1 to 1.05:1 and wherein the methylol urea solution contains a dispersing agent during the acidifying.

18. The method of claim 17 wherein the dispersing agent is selected from the group consisting of a condensed naphthalene sulfonate, a polyacrylate, a lignosulfonate salt and lignin.

19. A plant seed having an adherent coating thereon comprising an adhesive binder and a particulate urea-formaldehyde polymer having a particle size substantially between 1 and 150 microns, wherein the particulate urea-formaldehyde polymer is made by acidifying an aqueous methylol urea solution, wherein the aqueous methylol urea solution either contains a dispersing agent or is subjected to a high shear condition during the acidifying, to form an aqueous dispersion of insoluble urea-formaldehyde polymer particles.

20. The plant seed of claim 19 wherein most of the urea-formaldehyde particles have a size between 10 and 80 microns.

21. The plant seed of claim 20 wherein the urea-formaldehyde particles have a number average particle size between 25 and 35 microns.

22. A method of enhancing the growth and development of a plant grown from seed comprising providing said seed with an adherent coating thereon comprising an adhesive binder and a particulate urea-formaldehyde polymer having a particle size substantially between 1 and 150 microns prior to planting said seed, wherein the particulate urea-formaldehyde polymer is made by acidifying an aqueous methylol urea solution, wherein the aqueous methylol urea solution either contains a dispersing agent or is subjected to a high shear condition during the acidifying, to form an aqueous dispersion of insoluble urea-formaldehyde polymer urea-formaldehyde polymer particles have a size between 1 and 150 microns.

23. The method of claim 22 wherein most of the urea-formaldehyde particles have a size between 10 and 80 microns.

24. The method of claim 23 wherein the urea-formaldehyde particles have a number average particle size between 25 and 35 microns.

25. The seed of claim 1, 2, 3, 4, 5, 8, 19, or 21 wherein the seed is selected from the group consisting of grass seed, barley, oats, corn, sunflower, sugar beets, rape, safflower, flax, canary grass, tomatoes, cotton seed, peanuts, soybean, wheat, rice, alfalfa, sorghum, beans, carrot, broccoli, cabbage and flower seeds.

26. The seed of claim 25 wherein said coating has an additional adjuvant selected from the group consisting of calcium carbonate; gypsum; metal silicates; metal chelates of a metal selected from iron, zinc and manganese; talc; elemental sulfur; activated carbon; pesticides; herbicides; fungicides; super absorbent polymers; wicking agents; wetting agents; plant stimulants; urea, inorganic fertilizers, sources of phosphorus and sources of potassium.

27. The seed of claim 25 wherein the particulate urea-formaldehyde polymer is provided in an amount to result in a release of nitrogen at a rate consistent with the growth rate of the plant.

28. The seed of claim 25 wherein the particulate urea-formaldehyde polymer particles contain 36% nitrogen.

29. The method of claim 10, 11, 15, 16, 17, 22 or 23 wherein the seed is selected from the group consisting of grass seed, barley, oats, corn, sunflower, sugar beets, rape, safflower, flax, canary grass, tomatoes, cotton seed, peanuts, soybean, wheat, rice, alfalfa, sorghum, beans, carrot, broccoli, cabbage and flower seeds.

30. The method of claim 29 wherein said seed coating has an additional adjuvant selected from calcium carbonate; gypsum; metal silicates; metal chelates of a metal selected from the group consisting of iron, zinc and manganese; talc; elemental sulfur; activated carbon; pesticides; herbicides; fungicides; super absorbent polymers; wicking agents; wetting agents; plant stimulants; urea, inorganic fertilizers, sources of phosphorus and sources of potassium.

31. The method of claim 29 wherein the particulate urea-formaldehyde polymer is provided in an amount to result in a release of nitrogen at a rate consistent with the growth rate of the plant.

32. The method of claim 29 wherein the particulate urea-formaldehyde polymer particles contain 36% nitrogen.

33. An artificial seedbed containing a seed according to any one of claims 1, 2, 5, 8, 19, or 21.

34. A method for making a coated plant seed having an adherent coating of a particulate urea-formaldehyde polymer thereon comprising contacting a plant seed with an adhesive binder and with a particulate urea-formaldehyde polymer having a particle size substantially between 1 and 150 microns.

35. The method of claim 34 wherein the particulate urea-formaldehyde polymer comprises from 50% to about 99% by weight of the adherent coating.

36. The method of claim 35 or 34 wherein the particulate urea-formaldehyde polymer is made by acidifying an aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

37. The method of claim 36 wherein the aqueous methylol urea solution is made by reacting urea and formaldehyde at a urea:formaldehyde mole ratio of approximately 1:1.

38. The method of claim 37 wherein the aqueous methylol urea solution is made by reacting urea and formaldehyde at a urea: formaldehyde mole ratio of 0.83:1 to 1.1:1.

39. The method of claim 38 wherein the methylol urea solution is made by reacting urea and formaldehyde at a urea:formaldehyde mole ratio of 0.95:1 to 1.05:1.

40. The method of claim 34 wherein the particulate urea-formaldehyde polymer is made by acidifying an aqueous methylol urea solution made by reacting urea and formaldehyde at a urea:formaldehyde mole ratio of 0.95:1 to 1.05:1 and wherein the methylol urea solution contains a dispersing agent during the acidifying.

41. The method of claim 40 wherein the dispersing agent is selected from the group consisting of a condensed naphthalene sulfonate, a polyacrylate, a lignosulfonate salt and lignin.

42. The method of claim 34, 35, 40, or 41 wherein the seed is selected from the group consisting of grass seed, barley, oats, corn, sunflower, sugar beets, rape, safflower, flax, canary grass, tomatoes, cotton seed, peanuts, soybean, wheat, rice, alfalfa, sorghum, beans, carrot, broccoli, cabbage and flower seeds.

43. The method of claim 42 wherein said coating has an additional adjuvant selected from the group consisting of calcium carbonate; gypsum; metal silicates; metal chelates of a metal selected from iron, zinc and manganese; talc; elemental sulfur; activated carbon; pesticides; herbicides; fungicides; super absorbent polymers; wicking agents; wetting agents; plant stimulants; urea, inorganic fertilizers, sources of phosphorus and sources of potassium.

44. The method of claim 42 wherein the particulate urea-formaldehyde polymer particles contain 36% nitrogen.

45. The method of claim 34 wherein most of the urea-formaldehyde particles have a size between 10 and 80 microns.

46. The method of claim 45 wherein the urea-formaldehyde particles have a number average particle size between 25 and 35 microns.

* * * * *

UNITED STATES PATENT AND TRADEMARK OFFICE
CERTIFICATE OF CORRECTION

| | |
|---|---|
| PATENT NO. | : 7,213,367 B2 |
| APPLICATION NO. | : 10/396700 |
| DATED | : May 8, 2007 |
| INVENTOR(S) | : Stacy L. Wertz |

It is certified that error appears in the above-identified patent and that said Letters Patent is hereby corrected as shown below:

In Claim 22, Column 17, Lines 5-7:
   Please delete "urea-formaldehyde polymer particles have a size between 1 and 50 microns." and insert --particles.--

Signed and Sealed this

Twentieth Day of November, 2007

JON W. DUDAS
*Director of the United States Patent and Trademark Office*